(12) United States Patent
Brickell et al.

(10) Patent No.: US 6,959,394 B1
(45) Date of Patent: Oct. 25, 2005

(54) SPLITTING KNOWLEDGE OF A PASSWORD

(75) Inventors: Ernie Brickell, Portland, OR (US); Keen Chan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 932 days.

(21) Appl. No.: 09/672,495

(22) Filed: Sep. 29, 2000

(51) Int. Cl.[7] ............................................. H04L 9/00
(52) U.S. Cl. .................. 713/202; 713/184; 713/200; 713/201; 380/44; 705/71; 705/18
(58) Field of Search ............................... 713/202, 183, 713/200, 201, 184; 380/44; 705/18, 71; 700/225–227, 700/237; 711/164; 714/164

(56) References Cited

U.S. PATENT DOCUMENTS

2002/0067832 A1 * 6/2002 Jablon ........................ 380/277

OTHER PUBLICATIONS

Jablon, David P. Systems, Methods and Software for Remote Password Authentication using multiple servers. Jun. 5, 2000 U.S. Appl. No. 60/209258.*
Jablon, David P. Systems, Methods and Software for Remote Password Authentication using multiple servers. Jul. 3, 2000 U.S. Appl. No. 60/215835.*
"Server-Assisted Generation of a Strong Secret from a Password", Ford et al., IEEE 2000.

* cited by examiner

Primary Examiner—Kambiz Zand
(74) Attorney, Agent, or Firm—Pillsbury Winthrop Shaw Pittman LLP (57) ABSTRACT

A password is split into a plurality of pieces. The pieces are stored at different remote servers. The different remote servers have the property that together they can determine that the user has knowledge of the correct password. If any subset of the servers are compromised, the compromised subset cannot convince any remaining servers that they know the password.

27 Claims, 7 Drawing Sheets

SPLITTING KNOWLEDGE OF A PASSWORD

BACKGROUND OF THE INVENTION

1. Field of the Invention

The present invention relates generally to cryptographic systems, and more particularly, to securing keys in a cryptographic system.

2. Description of Related Art

The increasing accessibility of public networks, such as the Internet, allow a wide variety of data to be quickly and cost effectively accessed from virtually anywhere. The Internet, for example, allows users to access databases such as web page servers from any computer connected to the Internet.

A challenge associated with accessing data at remote databases over insecure networks is user authentication. That is, before sending data, which may be personal or confidential, the data provider would like to verify that the recipient is who he claims to be.

Traditional authentication is performed using a user name (login name) and a user password. When challenged by the remote data service, the user enters his login name and password. If the entered information matches the login name and password pre-stored at the service, the user is considered to be authentic and is allowed access.

One disadvantage of the above authentication technique is that the user's password is stored on the authenticating computer. Accordingly, if the authenticating computer is compromised, the user's password may be stolen and subsequently used to authenticate unauthorized parties. Even if the authenticating computer is hardened against external attacks, the user's password is still vulnerable to attacks originating from inside. Moreover, even if the authentication is done by first hashing the password, an insider can still determine the password through a brute force search through the password space until he finds one that hashes to the correct value. This search will be feasible if the user chooses a weak password, as users commonly do.

Another aspect of cryptography related to authentication is the secure storage of cryptographic keys. In public key cryptography, a cryptographic algorithm is used with two numerical codes called keys, one of which is referred to as the public key and the other the private key. To encrypt information, a user inputs a public key to the cryptographic algorithm along with the information to be encrypted. The resultant information, encrypted with the public key, can only be decrypted with the corresponding private key. For example, if a first user encrypts a message with the public key, only the holder of the private key can recover the original message. Even the first user, absent the private key, cannot decrypt the message.

Parties wishing to securely communicate with one another over an insecure network using a public key cryptographic system begin by exchanging their public keys. The sending party then encrypts its information using the second party's public key. The second party decrypts the received information using its private key. Similarly, when digitally signing a document using public key cryptographic systems, the signing party signs the document using its private key. Correctly decrypting the signature with the signing parties public key verifies the identity of the signing party.

For a public key cryptographic system to be reliable, the communicating parties must keep their respective private keys secure. A user's private key is typically stored at the user's computer. Alternatively, the user's private key may be stored at a remote key server. In either situation, the user's private key may be compromised if the computer(s) storing the private key are compromised, either by an external attack or by internal duplicity.

Often users want to use their private key from some computer other than the computer that they used to create the private key. One way to do this is to store the key encrypted by a user's password at a remote key server. However, if the user chooses a weak password, and the key server is compromised, then the user's private key can be determined.

Thus, there is a need in the art to improve the security of stored passwords and/or keys.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

As described herein, knowledge of a password is distributed among multiple independent computer systems. The password is secure against attacks on other than all of the computer systems.

Figure 1:
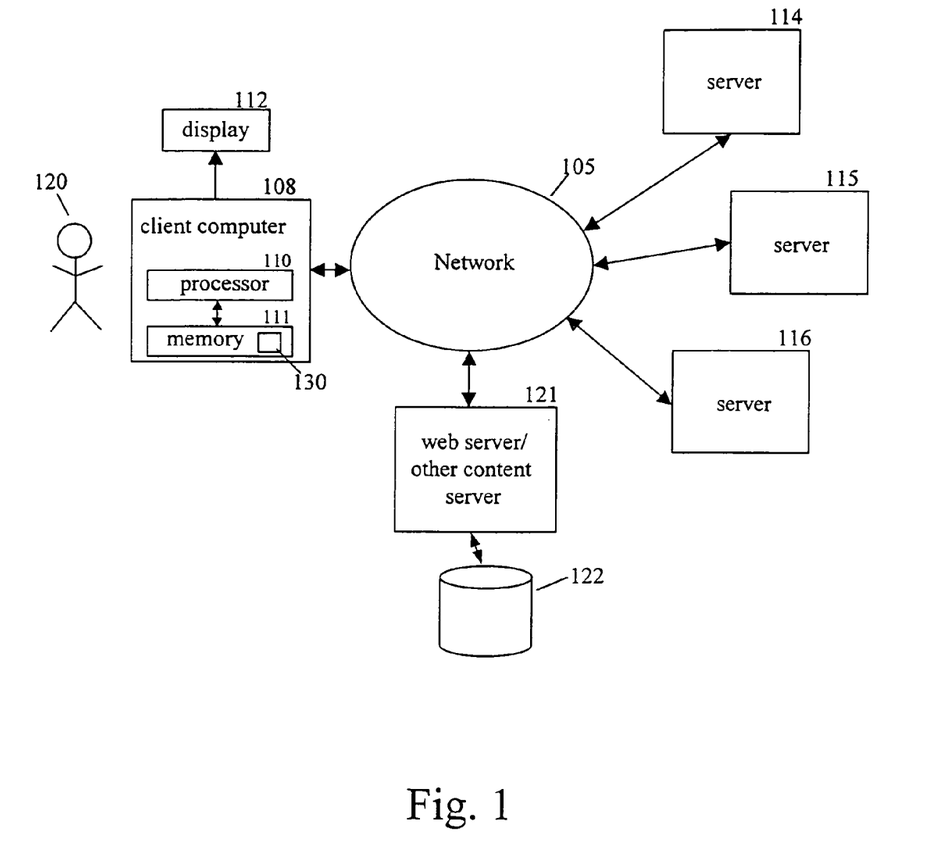
FIG. 1 a diagram illustrating an exemplary computer network on which concepts consistent with the present invention may be implemented.

FIG. 1 is a diagram illustrating an exemplary computer network in which concepts consistent with the present invention may be implemented. The computer network includes a client computer 108 coupled to network 105, which may be, for example, the Internet. Through client computer 108, user 120 accesses information stored at remote computers, such as web server 121. Client computer 108 includes a processor 110 operatively coupled to computer memory 111 and a display 112. Processor 110 executes program instructions stored in computer memory 111, such as cryptographic program 130 (described in more detail below).

Although illustrated as a traditional personal computer, computer 108 could alternatively be any number of different computing devices connected to network 105, such as a personal digital assistant, a "smart" cellular telephone, a pager, or a web pad.

Servers 114–116 are remote key/password servers that are connected to client computer 108 via network 105. To the extent possible, servers 114–116 are independent of one another; meaning that an attack on one of servers 114–116 should not compromise the other server. Together, servers 114–116 and client computer 108 securely store a user's password or cryptographic key. Even if one or more of servers 114–116 or client computer 108 is compromised, either via an internal or external attack, the compromised server cannot (with high probability) convince the remaining servers that it knows the password or key.

Web server 121 is an exemplary content server. User 120 may access information stored in database 122 via web server 121. Typically, before web server 121 allows user 120 to access information stored in database 122, user 120 logs in to authenticate himself to web server 121.

As discussed, servers 114–116 and client 108 together operate to securely store a password or cryptographic key. Embodiments related to this function will be discussed in more detail below.

Authentication Using a Weak Password

Concepts consistent with the present invention can provide secure authentication capabilities using only a weak password.

Figure 2:
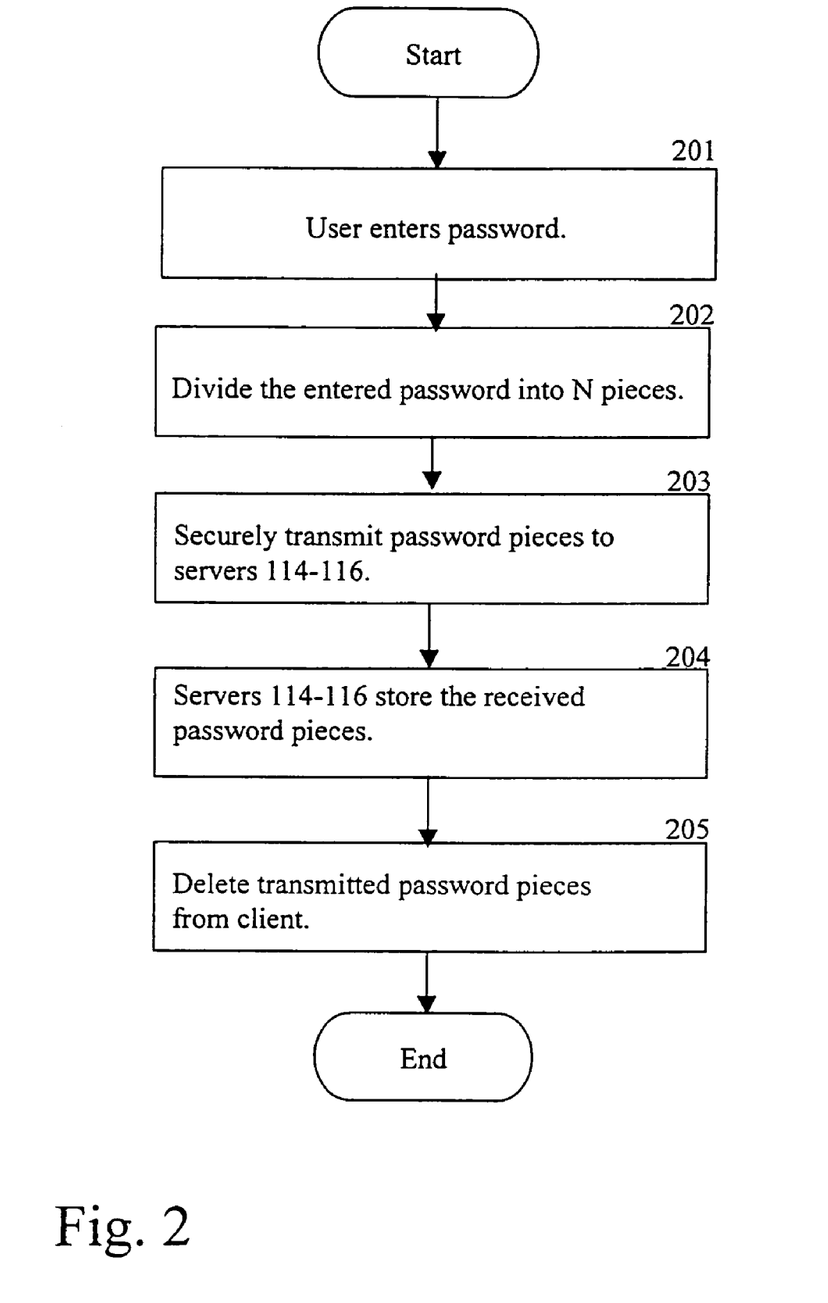
FIG. 2 is a flow chart illustrating methods for registering a password used for authentication.

Before a user can begin to use servers 114–116, he must first register the password that he wishes to keep secret with servers 114–116. FIG. 2 is a flow chart illustrating methods for registering a password used for authentication.

To begin, the user enters the password he would like to register. (Act 201). The password may even be a weak password. Weak passwords—passwords that are short or based on real words—are vulnerable to brute force cracking algorithms that discover the password by trying a large number of possible passwords. An adversary can mount such an attack if the adversary can find information protected with the password in which the adversary can try an unlimited number of passwords until the adversary finds the one that was used for the protection. This can happen if a password is used to encrypt information stored on a PC, or if a password is used as an authentication mechanism and there are no controls on the number of unsuccessful attempts that are allowed.

Strong passwords are passwords that are long enough so that a brute force attack is not likely to be able to guess the correct password. Strong passwords, although desirable from a security standpoint, are not particularly user friendly. Users do not like to type in long phrases every time they begin a secure session. Additionally, strong passwords can be difficult to remember.

Encryption program 130 divides the entered password into N pieces, where N is the number of remote servers that the password is to be stored at. (Act 202). In FIG. 1, three remote servers 114–116 are shown. Accordingly, in this example, encryption program 130 would divide the password into three pieces.

For optimal distribution of the password, the password should be divided so that each piece of the password contains approximately the same information content. That is, the entropy of each piece should be about the same. To do this, it is necessary to get an approximation of the entropy of the password space. This can be determined by writing suggestions for picking passwords, choosing a sample of people to select passwords, and then analyzing the entropy in the selected passwords. It is recommended that passwords have at least 8 bits of entropy for each piece. So when dividing the password into 3 pieces, the recommendation would be for 24 bits of entropy. One way to divide the password into pieces would be to hash the password using a cryptographic hashing algorithm that receives the user password as input. Optionally, the user's login name and a fixed random value (i.e., a "Salt" value) may also be input to the hashing algorithm.

In general, hashing algorithms take arbitrary strings as input, and produce an output of fixed size (e.g., 128 bits) that is dependent on the input. Ideally, it should never be possible to derive the input data given the hash algorithm's output. For a hashing algorithm to be cryptographically secure, it must be very difficult to find two input strings that produce the same output hash value, or to find an input string that produces a given hash value. The PKCS #5 encryption suite, available from RSA, Inc., of Bedford, Mass., includes suitable cryptographically secure hashing algorithms. The output value of the hashing algorithm tends to distribute the information content of the input string evenly in the fixed output.

As an example of the implementation of Act 202, assume that the user enters the password "Food>dog52" and has a user name "Bob." Program 130 calculates a 128 bit hash value based on the string equal to the concatenation of the inputs "Food>dog52," "Bob," and optionally, on a Salt value. The resulting hash value is a 128 bit number. We will assume in this example that a password has been chosen with 24 bits of entropy. Because there are 8 bits of entropy for each piece, each piece comprises 8 bits of the 128 bit hash value.

The N password pieces are securely transmitted to the N remote servers. (Act 203). The secure transmission can be accomplished by encrypting each piece with a public key assigned to servers 114–116. Thus, in the example shown in FIG. 1, the first piece would be encrypted using the public key of server 114, the second piece with the public key of server 115, and the third piece with the public key of server 116.

Alternatively, instead of encrypting the password pieces using the public key of each server, the password pieces may be encrypted using a symmetric encryption algorithm and a pre-agreed upon key, or simply transmitted to the servers using a secure connection, such as an SSL connection.

After securely transmitting the password pieces to the respective servers 114–116, the servers store the received password pieces for later authentication, along with information identifying the user, such as the user's login name. (Act 204).

Finally, cryptographic program 130 deletes the password and the password pieces transmitted to servers 114–116. (Act 205).

As an alternative to the example given above for dividing the password into N pieces by generating a hash value based on the password, an alternative implementation is to take N different hashes of the password, each with a different Salt value, to obtain N different hash values. From each of the N different hashes, a predetermined number of bits is taken for each password piece, where the predetermined number is equal to the expected entropy of the password (expressed as an integer number of bits) divide by N.

Figure 3:
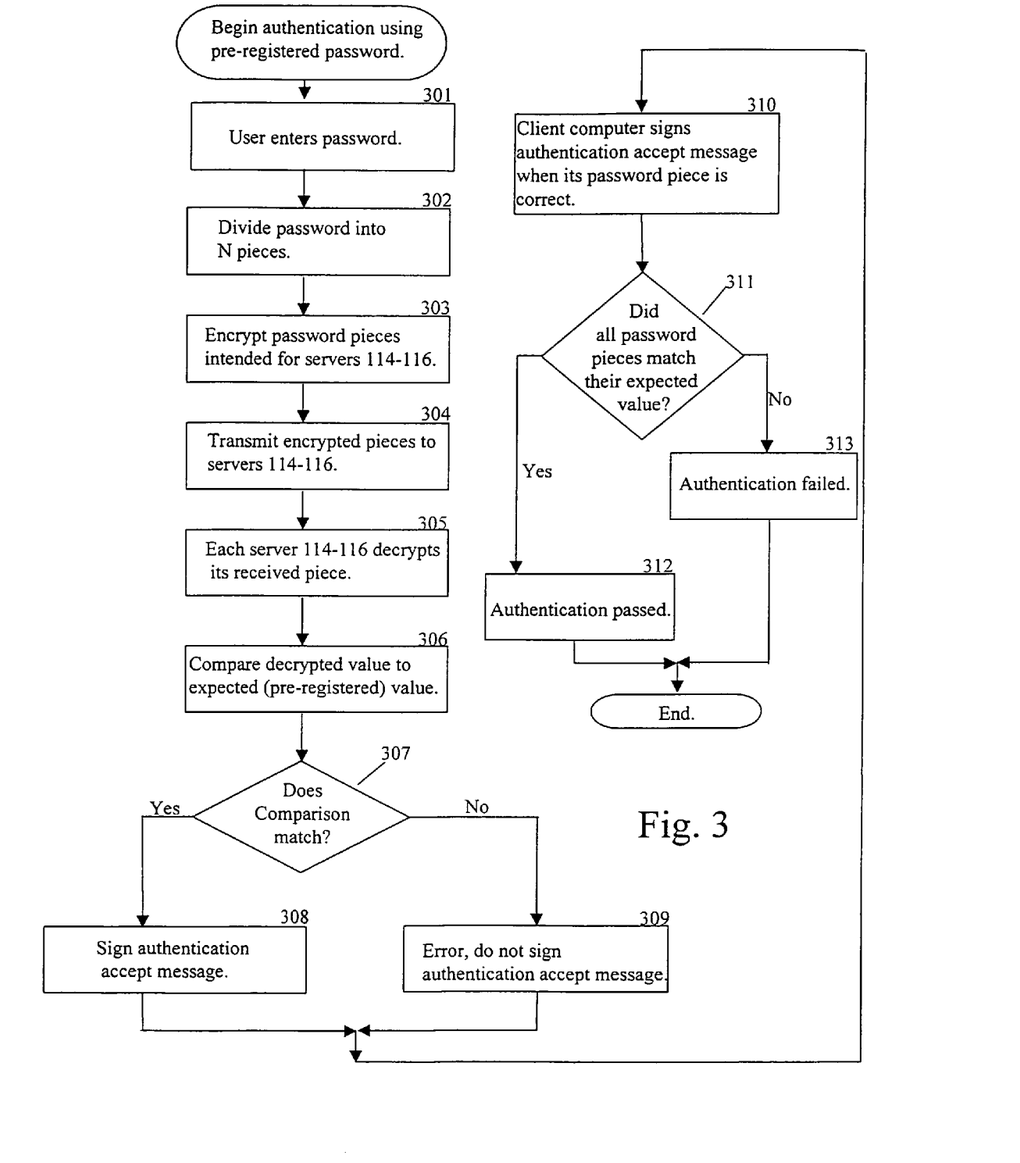
FIG. 3 is a flow chart illustrating methods for using a registered password for authentication.

After the user's password is registered, it may be used for authentication. FIG. 3 is a flow chart illustrating methods consistent with the present invention for using a registered password for authentication. Assume that the user wishes to authenticate himself at computer 121, so that he may then access database 122. The authentication is based on the user receiving a signed message from each of the servers 114–116. The user begins by entering his password into cryptographic program 130. (Act 301). Cryptographic program 130 divides the password into N pieces using the same method used during registration. (Act 302). The password pieces may then be encrypted for each server 114–116 using the same method used during registration, (Act 303), and then transmitted to the respective servers 114–116. (Act 304). Each server 114–116, after receiving its encrypted password piece, decrypts the password piece and compares the encrypted piece to the value pre-stored for that user. (Acts 305 and 306). At each server, if the received password piece matches the pre-stored piece, the server signs an "authentication accept" message. (Acts 307 and 308). Signing a message refers to cryptographically signing the message using the server's private key. If the received password piece does not match, no "authentication accept" message is signed. (Acts 307 and 309). The signed "authentication accept" messages are sent to the cryptographic program 130, which then sends all of the authentication accept messages to the remote computer 121 at which the user is attempting to authenticate himself. It is recommended that all of these communications be encrypted.

Computer 121 passes the authorization process if each of the signed authentication messages is received. (Acts 311, 312). Otherwise, the authorization fails. (Act 313).

According to the above-discussed methods, during the authentication process, each server stores a portion of the password. User authentication is not complete until each computer correctly receives its portion of the password. Thus, even if two of servers 114–116 are compromised, authentication by an unauthorized party would fail. Also, the user may travel to any client computer and authenticate using his password. To enhance security, each server 114–116 may support a limited try feature. After some number of failed authorization attempts (e.g., 5), the server will quit accepting attempts from that user for some period of time and may notify the other servers to do the same. After some lifetime maximum number of failed attempts, the server may lock the account.

Accessing a Strong Random Password Using a Weak Password

Figure 4:
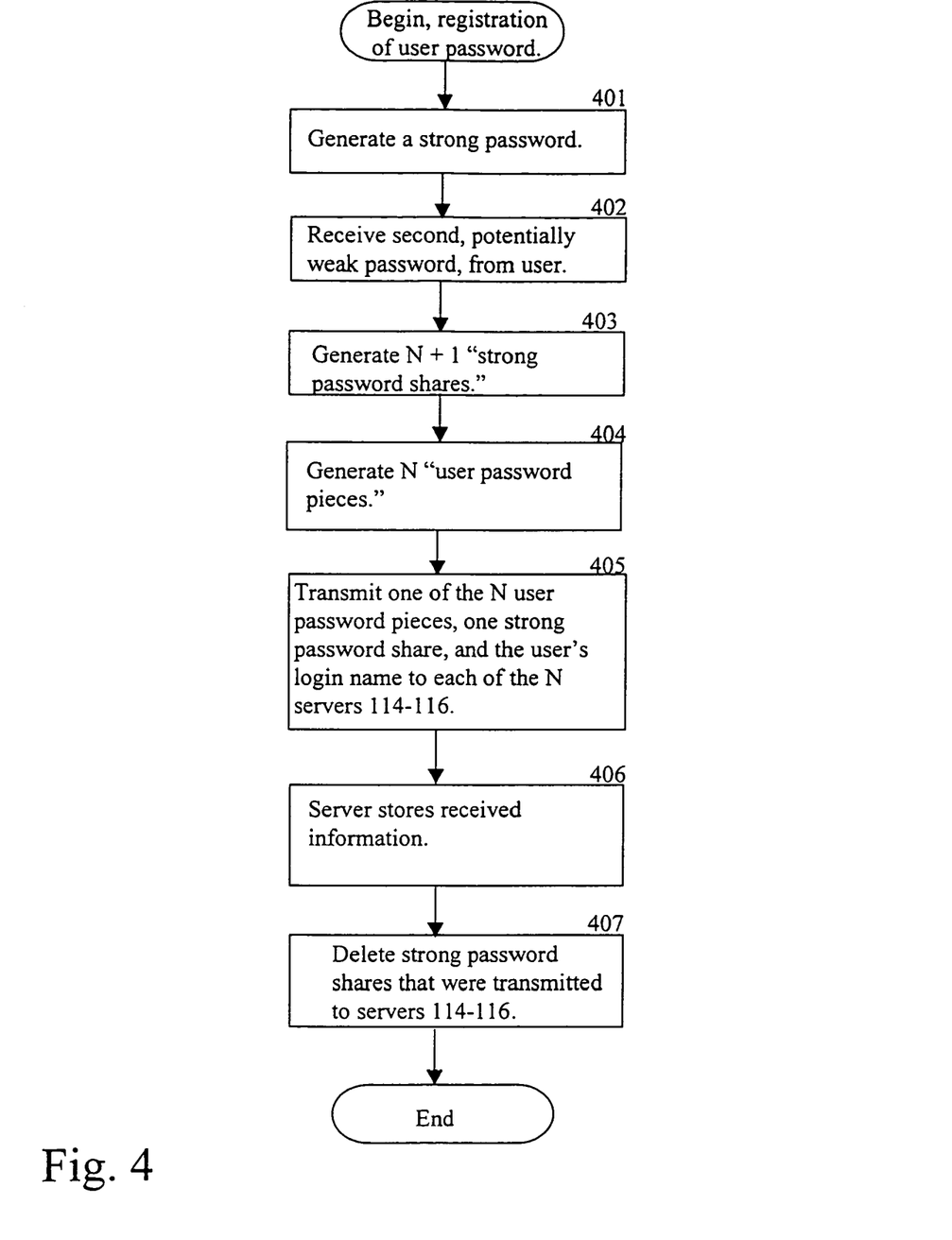
FIG. 4 is a flow chart illustrating methods for registering a strong password for later retrieval.

As an alternative to servers 114–116 sending an authentication accept message to an authenticating computer, servers 114–116 may securely store and return portions of a strong password to a user without the user having to remember a strong password. FIG. 4 is a flow chart illustrating methods consistent with the present invention for registering the user's strong password. In brief, a strong password is distributed among a plurality of servers. The user authenticates himself to the servers with a second, user password, which may be a weak password. If successful, the servers return information to the user that allows cryptographic program 130 to reconstruct the strong password.

Cryptographic program 130 begins by generating a strong password and eliciting the second user password from user 120. (Acts 401 and 402). Cryptographic program 130 then produces N+1 (given N servers) numbers that together can be used to reconstruct the strong password. (Act 403) These will be called the strong password shares. N of the shares will be given to the N servers, and the remaining strong password share is a local share that is constructed by cryptographic program 130 each time the user enters their user password. One method for generating these shares follows. Cryptographic program 130 computes a hash using a cryptographically secure hashing algorithm, such as available in the PKCS#5 encryption suite, based on the user password, and optionally based on the user login name and a Salt value. The Salt value is a fixed random number. This hash forms the strong password local share. N−1 of the other shares are chosen as random numbers. One possible size for these random numbers would be 160 bits to match the output of the hash function. The final strong password share is chosen to be the exclusive-or (XOR) of the strong password, the local password share, and all of the N−1 random shares.

Cryptographic program 130 next takes the user password, and forms N "user password pieces," which will be used to authenticate the user to servers 114–116. (Act 404). One way to generate the N user password pieces is by using a cryptographically secure hashing algorithm, such as the slow hashing algorithm available in the PKCS#5 encryption suite, to generate a hash value based on the user password, and optionally based on the user login name and a Salt value. Some input into PKCS#5 must be different from the input used to form the strong password shares. If the Salt value is used, this can be accomplished by using a different Salt value for the two computations. The resultant hash value is divided into the user password pieces that are used in authentication at each of the N servers. For example, if the expected entropy of the user password divided by N equals eight bits, then eight bits of the hash would be used as the user password piece for each of the servers 114–116.

Cryptographic program 130 next transmits to each of servers 114–116, one of the user password pieces, and one of the strong password shares together with the user login name. (Act 405). This transmission should be encrypted, which could be accomplished by using SSL.

Finally, servers 114–116 store the received strong password shares, the user password pieces, and the user login name. (Act 406). Cryptographic program 130 deletes the strong password shares from client computer 108 that were transmitted to servers 114–116. (Act 407).

Figure 5:
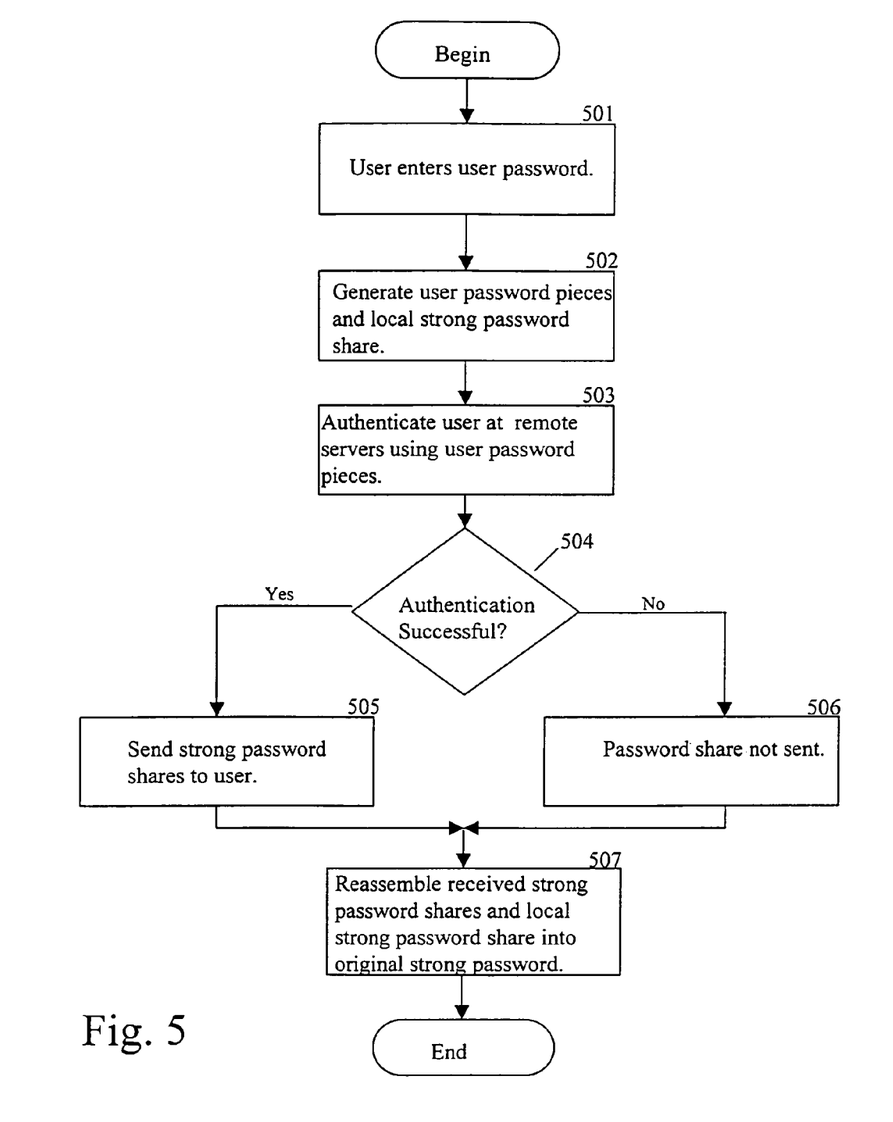
FIG. 5 is a flow chart illustrating methods for retrieving a registered strong password or cryptographic key.

After the user's strong password is registered, it may be accessed with the user password. FIG. 5 is a flow chart illustrating methods consistent with the present invention for accessing the strong password.

The user enters his user password. (Act 501). The user password is used to generate the user password pieces, and the local strong password share as described above. (Act 502). Cryptographic program 130 contacts servers 114–116, and initially authenticates the user based on the user password piece for that server and the user login name. (Act 503). If the authentication is successful (i.e., if the login name and the user password piece match their expected values), the server sends the strong password share to cryptographic program 130. (Acts 504 and 505). Otherwise, the authentication fails and the strong password share is not transmitted. (Acts 504 and 506). Finally, the received strong password shares (including the local strong password share) are reassembled back into the original strong password. (Act 507). If the strong password shares are constructed as described above, the then strong password will be the XOR of all of the strong password shares.

With the methods illustrated in FIGS. 4 and 5, a strong password is securely stored on multiple servers while the user is only required to learn a short password. Because the strong password is distributed on multiple servers, the password is resistant to attack. However, the user is able to reconstruct his strong password from any PC that has cryptographic program 130 by remembering only his user password. Another property of this method is that even if all of the servers collaborate, they cannot form the strong password without performing a brute force search through all possible user passwords.

As with the methods illustrated in FIGS. 2 and 3, one of ordinary skill in the art will recognize that more or less than the three servers 114–116 could be used. Further, a local strong password share would not have to be used.

Accessing a Cryptographic Key Split Among Multiple Servers

As an alternative to servers 114–116 sending an authentication accept message to an authenticating computer, servers 114–116 may securely store portions of a split cryptographic key and return the results of a cryptographic operation performed using the split key.

Figure 6:
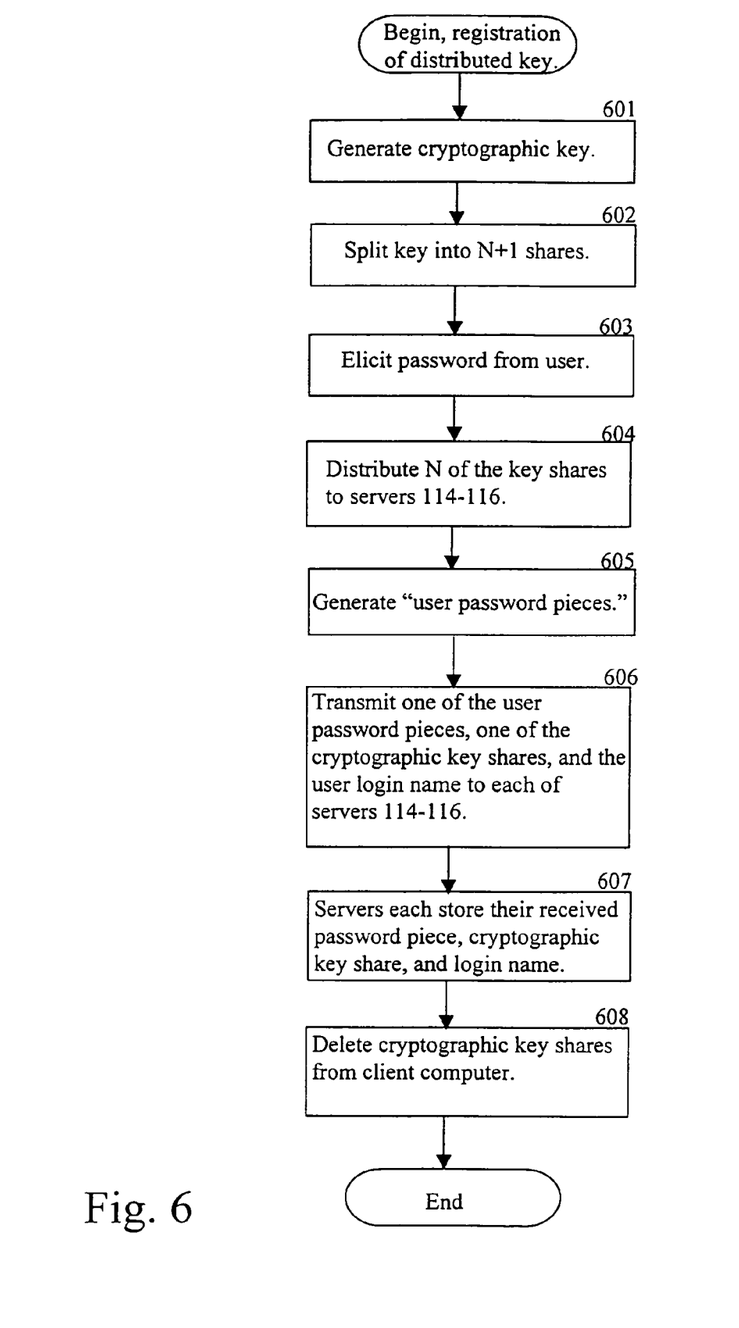
FIG. 6 is a flow chart illustrating methods for registering a cryptographic key that is split among multiple servers.

FIG. 6 is a flow chart illustrating methods consistent with the present invention for registering the user's distributed cryptographic key. In brief, a cryptographic key is split into pieces and distributed among a plurality of servers. The user authenticates himself to the servers with a password and sends a message that requires a cryptographic operation by a secret key, for example, either signing or decryption. If the authentication is successful, the server performs the cryptographic operation.

The process of splitting a cryptographic key into pieces is well known in the art, and is often called threshold cryptography or distributed cryptography.

Cryptographic program 130 begins by generating a cryptographic key, and splitting it into N+1 shares using the known methods to split cryptographic keys. (Acts 601 and 602). Cryptographic program 130 additionally elicits a user password from user 120. (Act 603).

N of the shares are distributed to the servers 114–116. (Act 604). The last, local share is reconstructed by the cryptographic program 130 whenever the user enters his password.

One way to provide for the reconstruction of the local share is as follows. The cryptographic program 130 computes a local share hash using a cryptographically secure hashing algorithm that receives the user's password as an input, and optionally receives the user's login name and a Salt value. Then cryptographic program 130 forms a local share mask which is the XOR of the local share and the local share hash. This local share mask can be stored with one of servers 114–116, or in some other location.

User password pieces are used to authenticate the user with servers 114–116 in the manner previously described in the methods discussed with reference to FIGS. 4 and 5. As discussed, cryptographic program 130 generates the user password pieces based on a hash value derived from the user's password. (Act 605). Parts of the resultant hash value are then used as the authentication for each of the N servers.

Cryptographic program 130 transmits to each of the servers 114–116, one of the user password pieces, one of the cryptographic key shares, and the user login name. (Act 606). This transmission should be encrypted, which could be accomplished by using SSL.

Finally, servers 114–116 store the received cryptographic key shares, the user password pieces, and the user login name. (Act 607). Cryptographic program 130 deletes the cryptographic key pieces from client computer 108 that were transmitted to servers 114–116. (Act 608).

Figure 7:
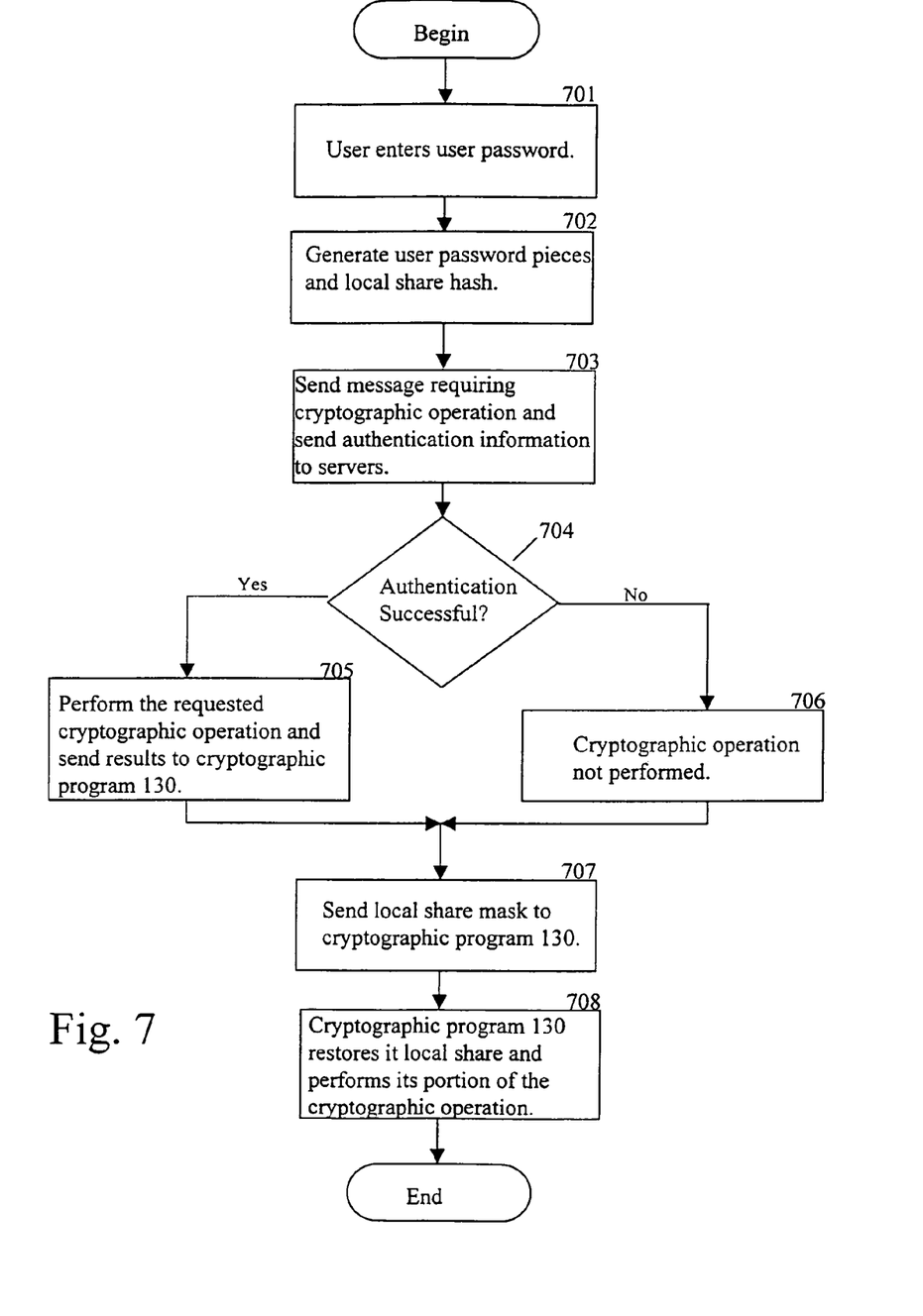
FIG. 7 is a flow chart illustrating methods for performing distributed cryptography with a cryptographic key split among multiple servers.

After the user's cryptographic key is registered, it may be accessed with the user's password. FIG. 7 is a flow chart illustrating methods consistent with the present invention for accessing the cryptographic key.

The user enters his password. (Act 701). The user password is used to generate the user password pieces, and the local share hash as described above. (Act 702). Cryptographic program 130 contacts servers 114–116, and sends to the servers the message that requires a cryptographic operation, the user login name and the user password piece for that server. (Act 703). The login name and user password piece are used for authentication at each server. If the authentication is successful (i.e., if the login name and the user password piece match their expected values), the server performs the requested cryptographic operation on the message and sends the result to cryptographic program 130. (Acts 704 and 705). Otherwise, the authentication fails and the cryptographic operation is not performed. (Acts 704 and 706). The results of the cryptographic operations are received by the cryptographic program 130. The server that is holding the local share mask also sends it to the cryptographic program 130. (Act 707). Cryptographic program 130 then XORs the local share hash and the local share mask to form the local share. It then performs the cryptographic operation on the message that requires the cryptographic operation. (Act 708). This result, and the results from servers 114–116 are then combined according to an appropriate threshold cryptography algorithm to obtain the final result.

With the methods illustrated in FIGS. 6 and 7, a cryptographic key is securely stored on multiple servers while the user is only required to learn a short password. Because the password is distributed on multiple servers, the password is resistant to attack to less than all of the servers. However, the user is able to have the cryptographic operation performed from any PC that has cryptographic program 130 by remembering only his user password. Also, this cryptographic operation is performed without ever reconstructing the complete private cryptographic key. Another property of this method is that even if all of the servers collaborate, they cannot perform all portions of the cryptographic operation without performing a brute force search through all possible user passwords. One of ordinary skill in the art will recognize that more or less than the three servers 114–116 could be used.

In all of the techniques described above, the described procedure was to provide each server with a piece of the password that had entropy that was equal to the entropy in the password divided by the number of pieces. This condition could optionally be removed. This would change the security offered by the system. It would decrease the number of servers that an adversary would need to compromise to theoretically get enough information to compute the password of the user.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of accessing a password comprising:
dividing the password received from a client into a plurality of pieces by taking a plurality of hashes of the password, each hash using a different salt value to obtain a plurality of hash values, from each of which a predetermined number of bits are taken to represent each password piece of the plurality of pieces;
storing each piece of the plurality of pieces of the password on a different one of a plurality of servers, each of the plurality of servers being independent from others of the plurality of servers;
separately authenticating a user at each of the plurality of servers, each of the plurality of servers transmitting the piece of the password stored at the respective server to the user when the authentication at that server is successful;
assembling the password from the password pieces transmitted from the plurality of servers; and
deleting the password and the plurality of pieces of the password from the client.

2. The method of claim 1, wherein the password is a private key in a public/private key pair.

3. The method of claim 1, wherein a second password is used to authenticate the user at each of the plurality of servers, the second password being a weak password.

4. The method of claim 3, wherein each of the pieces of the password are encrypted before being stored on each of the servers, encryption keys for the encryption of the password pieces being derived from the second password.

5. A method of securely storing a password comprising:
receiving an encrypted portion of the password, the encrypted portion of the password comprising less than the entire password and being derived by taking a plurality of hashes of the password, each hash using a different salt value to obtain a plurality of hash values, from each of which a predetermined number of bits are taken to represent the portion of the password which is then encrypted;
storing the encrypted portion of the password with identification information for a user of the encrypted portion of the password;
receiving a request for the encrypted portion of the password, the request including the identification information; and
returning the encrypted portion of the password to the user when the identification information in the request matches the stored identification information.

6. The method of claim 5, wherein the password is a private key in a public/private key pair.

7. The method of claim 5, wherein the received encrypted portion of the password is encrypted based on a symmetric encryption of the portion of the password using a key based on a second password, the second password being a weak password.

8. The method of claim 7, wherein the identification information of the user of the encrypted portion of the password is based on the second password.

9. A method of receiving a first password of a user, the method comprising:
entering a second password of the user;
authenticating the user at each of a plurality of servers based on the second password, the plurality of servers being independent from one another;
receiving an encrypted version of a portion of the first password from each of the plurality of servers at which the authentication was successful, each of the portions of the first password containing less than the entire password, and the portion of the first password being derived by taking a plurality of hashes of the first password, each hash using a different salt value to obtain a plurality of hash values, from each of which a predetermined number of bits are taken to represent the portion of the first password;
decrypting the received encrypted portions of the first password using encryption keys based on the second password; and
assembling the first password from the decrypted portions.

10. The method of claim 9, wherein the first password is a strong user password.

11. The method of claim 9, wherein the first password is a private key in a public/private key pair.

12. The method of claim 9, wherein the second password is a weak password.

13. A method of authenticating a user at a remote computer system comprising:
dividing a password entered by the user into a plurality of pieces by taking a plurality of hashes of the password, each hash using a different salt value to obtain a plurality of hash values, from each of which a predetermined number of bits are taken to represent each piece of the plurality of pieces of the password;
transmitting each piece of the plurality of pieces to corresponding ones of a plurality of remote servers, each of the plurality of remote servers being independent from others of the plurality of remote servers, and each of the remote servers having a respective piece of the plurality of pieces of the password pre-registered with the remote server;
comparing the transmitted piece of the plurality of pieces of the password to the pre-registered piece of the password at the plurality of servers;
generating an authentication accept message at each of the plurality of servers at which the pre-registered piece of the password matches the transmitted piece of the plurality of pieces of the password; and
authenticating the user when the authentication accept message is generated for all of the plurality of pieces of the password at the plurality of servers.

14. The method of claim 13, wherein a piece of the password is pre-registered at a computer local to the user and the authentication accept message is generated by the computer local to the user when the pre-registered piece of the password at the computer local to the user matches a corresponding piece of the password entered by the user.

15. The method of claim 14, wherein the authentication accept messages are received and accepted at a content server remote from the user.

16. A computer server comprising:
a computer memory; and
a processor coupled to the computer memory, wherein the processor receives an encrypted portion of a password, the encrypted portion of the password comprising less than the entire password, the encrypted portion of the password being derived by taking a plurality of hashes of the password, each hash using a different salt value to obtain a plurality of hash values, from each of which a predetermined number of bits are taken to represent the portion of the password which is then encrypted the encrypted portion of the password is stored with identification information of a user of the encrypted portion of the password over a secure connection, a request for the encrypted portion of the password is recieved, the request including the identification information, the encrypted portion of the password is returned to the user when the identification information in the request matches the stored identification information, and the computer server is independent of other computer servers storing other portions of the password.

17. The computer server of claim 16, wherein the password is a private key in a public/private key pair.

18. The computer server of claim 16, wherein the received encrypted portion of the password is encrypted based on a symmetric encryption of the portion of the password using a key based on a second password, the second password being a weak password.

19. The computer server of claim 18, wherein the identification information of the user of the encrypted portion of the password is based on the second password.

20. A computer readable medium containing computer instructions that when executed by a processor cause the processor to perform operations for securely storing a password comprising:
receiving an encrypted portion of the password, the encrypted portion of the password comprising less than the entire password and being derived by taking a plurality of hashes of the password, each hash using a different salt value to obtain a plurality of hash values, from each of which, a predetermined number of bits are taken to represent the portion of the password which is then encrypted;
storing over a secure connection the encrypted portion of the password with identification information of a user of the encrypted portion of the password;
receiving a request for the encrypted portion of the password, the request including the identification information; and
returning the encrypted portion of the password to the user when the identification information in the request matches the stored identification information.

21. The computer readable medium of claim 20, wherein the password is a private key in a public/private key pair.

22. The computer readable medium of claim 20, wherein the received encrypted portion of the password is encrypted based on a symmetric encryption of the portion of the password using a key based on a second password, the second password being a weak password.

23. The computer readable medium of claim 22, wherein the identification information of the user of the encrypted portion of the password is based on the second password.

24. A computer readable medium containing computer instructions that when executed by a processor cause the processor to perform operations that receive a first password of a user, comprising:
receiving a second password entered by the user;
authenticating the user at each of a plurality of servers based on the second password, the plurality of servers being independent from one another;
receiving an encrypted version of a portion of the first password from each of the plurality of servers at which the authentication was successful, each portion of the first password containing less than the entire password and being derived by taking a plurality of hashes of the first password, each hash using a different salt value to obtain a plurality of hash values, from each of which a predetermined number of bits are taken to represent the portion of the first password;
decrypting the received encrypted portions of the first password using encryption keys based on the second password; and
assembling the first password from the decrypted portions.

25. The computer readable medium of claim 24, wherein the first password is a strong user password.

26. The computer readable medium of claim 24, wherein the first password is a private key in a public/private key pair.

27. The computer readable medium of claim 24, wherein the second password is a weak password.

* * * * *